No. 644,859. Patented Mar. 6, 1900.
A. H. HOYT.
ELECTRICAL MEASURING INSTRUMENT.
(Application filed Sept. 22, 1899.)
(No Model.)
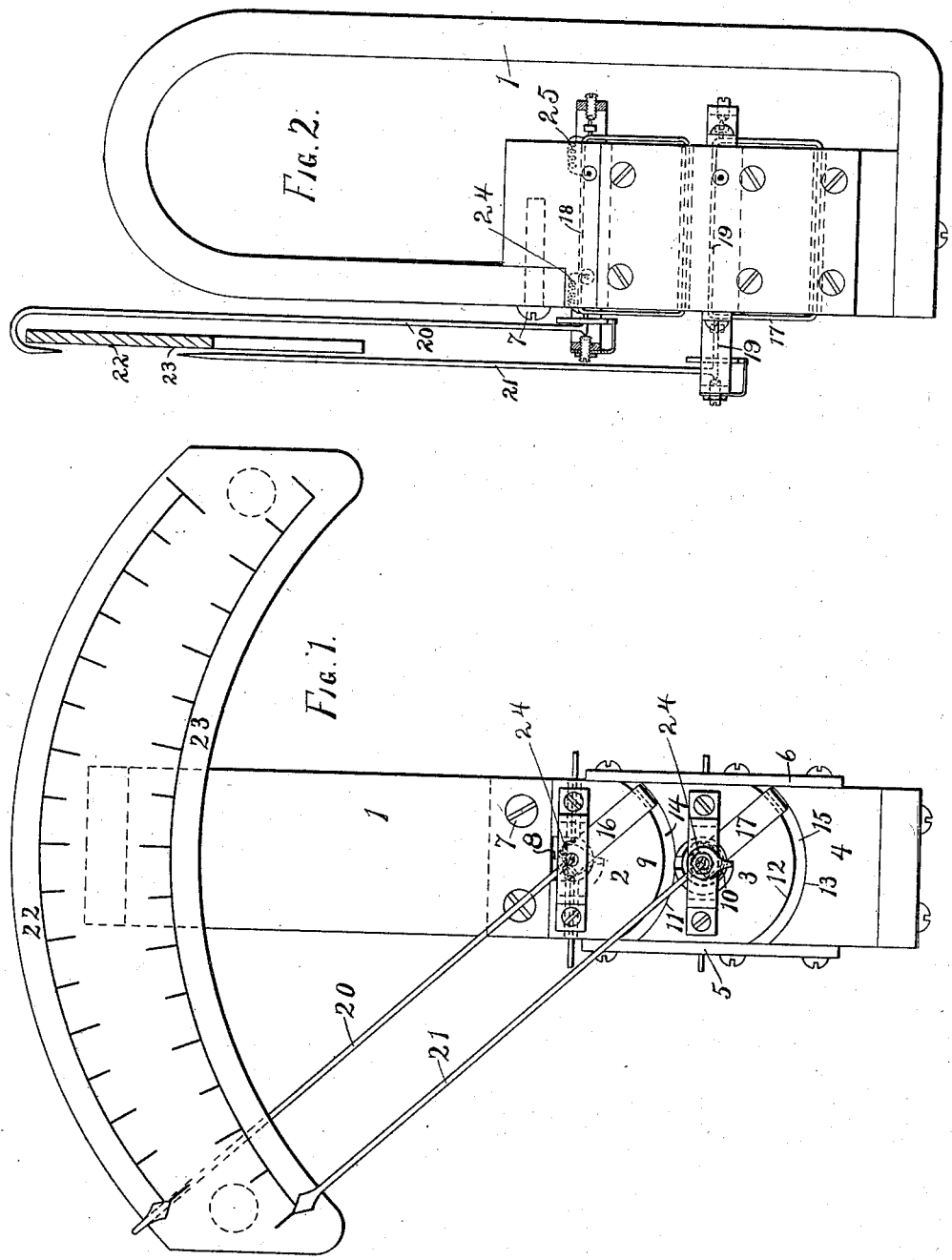
Witnesses
A. Ferguson.
F. D. Scanlon.
Adrian H. Hoyt, Inventor
By his Attorney
C. N. Edwards

UNITED STATES PATENT OFFICE.

ADRIAN H. HOYT, OF PENACOOK, NEW HAMPSHIRE.

ELECTRICAL MEASURING INSTRUMENT.

SPECIFICATION forming part of Letters Patent No. 644,859, dated March 6, 1900.

Application filed September 22, 1899. Serial No. 731,249. (No model.)

*To all whom it may concern:*

Be it known that I, ADRIAN H. HOYT, a citizen of the United States, residing at Penacook, in the county of Merrimac and State of New Hampshire, have invented certain new and useful Improvements in Measuring Instruments, of which the following is a full, clear, and exact specification.

This invention relates to electrical measuring instruments, and has particular reference to such instruments of this class as are used to measure more than one characteristic of the same or different currents or the same characteristic of different currents.

The invention is applicable for use upon automobile vehicles propelled by electricity for measuring the voltage and amperage of the electric current and will for purposes of illustration be described herein with reference to such use; but the invention is capable of various applications and modifications, and I therefore desire it to be understood that I do not herein limit myself to the precise constructions shown nor to its use in connection with automobiles or, in fact, any exclusive line of work. Heretofore in measuring the various characteristics of the same or different currents simultaneously it has been customary to use either a plurality of instruments, one for each characteristic, or a plurality of instrument-movements contained in a common case. Both of these arrangements are objectionable because of their cost and bulk. Instruments have also been made in which a single movement is employed to measure different characteristics; but readings of the different characteristics cannot be made simultaneously. According to my invention I propose to construct an instrument which shall be adapted to measure both the voltage and amperage of the current or any desired characteristics of the same or different currents and cause the same to be readable simultaneously upon adjacent scales, preferably parallel to and on the same plane with each other, and to utilize in such instrument one magnet common to the various indicating mechanisms.

Referring more particularly to the drawings, Figure 1 is a front view of one of the many forms which my invention may take in practice, and Fig. 2 is a side view of the structure shown in Fig. 1.

1 represents a magnet of suitable shape and construction, in this instance a permanent magnet, although of course, if preferred, an electromagnet may be utilized, and 2, 3, and 4 respectively represent pole-pieces secured in position by suitable strips 5 and 6. The pole-piece 2 is bolted to the magnet-frame by suitable means 7 and is preferably provided with an opening 8, extending through the same, and a segmental-shaped convex surface 9. The pole-piece 3 is also provided with an opening 10, extending through the same, and with a segmental concave surface 11, disposed opposite the surface 9, and with a similar convex surface 12 at its other end. Pole-piece 4 is suitably fixed to the magnet-frame and is provided with a segmental concave surface 13 opposite the surface 12. The pole-pieces 2, 3, and 4 are separated sufficiently to form the air-gaps 14 and 15.

Coils 16 and 17 embrace the poles 2 and 3, respectively, and extend through the respective openings 8 and 10 and are pivotally mounted upon suitable shafts therein, whereby the free sides of said coils are adapted to swing in the air-gaps 14 and 15, respectively.

The shaft 19, upon which coil 17 is mounted, extends upward farther than shaft 18, as illustrated in Fig. 2, and fixed to the outer ends of shafts 18 and 19 are the indicating-needles 20 and 21, respectively, the needle 20 being adapted to move across the calibrated scale 22 and the needle 21 across the calibrated scale 23. By reason of this difference in the length of the shafts the needles will move in parallel planes, and the arcs and also the segmental planes traversed thereby will also be parallel, or substantially so, and the different mechanisms may be compactly arranged, so that but little space will be occupied by the instrument. By reason of the fact that the needles are all mounted on the same side of the scales the arrangement of the mechanism is rendered still more compact.

The coils 16 and 17 are connected with the source of the current to be measured by suitable connections 24 and 25, according as the same or different currents are to be measured and according to whether the voltage or amperage is to be measured. When the instrument is used for automobile-work, in which connection I have described it herein for illustrative purposes, the coil 16 may be connected in series with a suitable resistance across the terminals of the source of current to indicate its voltage, and coil 17 may be connected in shunt to a portion of the circuit to indicate the amperage of the current flowing, according to well-known principles. The connections may, however, be varied in individual cases to meet different conditions.

In operation the current passes into the coils and by its action with respect to the fields of force causes the coils to swing upon the shafts 18 and 19, and thus move the indicating-needles 20 and 21 upon the calibrated scales, the needle 20 indicating the voltage and the needle 21 indicating the amperage of the current. The plane traversed by the needle 21 is outside that of the needle 20, and therefore there will be no interference between the needles in their movement.

Having thus described my invention, I declare that what I claim as new, and desire to secure by Letters Patent, is—

1. In a measuring instrument, the combination of a plurality of calibrated scales, an equal number of indicating-needles one for each scale, said needles being movable in parallel planes and all being pivoted on the same side of said scales, and mechanism for operating said needles, substantially as described.

2. In a measuring instrument, the combination of a plurality of calibrated scales, an equal number of pivotally-mounted indicating-needles one for each scale, said needles being so pivoted that the arcs traversed thereby will be substantially parallel, substantially as described.

3. In a measuring instrument, the combination of a plurality of calibrated scales, an equal number of pivotally-mounted indicating-needles the pivots of which are adjacent to each other, each of said needles being movable in a segmental plane, the arc boundaries of all of said planes lying on the same side of said pivots, and mechanism for operating said needles, substantially as described.

4. In a measuring instrument, the combination of a plurality of indicating mechanisms operated from a source or sources of current, a single magnet influencing said mechanisms, said magnet having adjacent extremities, and a plurality of air-gaps between said extremities, each of said mechanisms being under the influence of one of said air-gaps, substantially as described.

5. In a measuring instrument, the combination of a plurality of mechanisms operated from a source or sources of current, an indicating-needle operated by each of said mechanisms, said needles being movable in parallel planes, a single magnet influencing said mechanisms, said magnet having adjacent extremities, and a plurality of air-gaps between said extremities, each of said mechanisms being under the influence of said air-gaps, substantially as described.

6. In a measuring instrument, the combination of a plurality of calibrated scales, a similar number of indicating-needles, one for each scale, said needles being all mounted on the same side of said scales and movable in parallel superposed planes, and mechanism for operating said needles, substantially as described.

7. In a measuring instrument, the combination of a plurality of calibrated scales, an equal number of pivotally-mounted indicating-needles the pivots of which are adjacent to each other, said needles being movable in parallel, superposed, segmental planes, the arc boundaries of said segments all lying on the same side of said pivots, and mechanism for operating said needles, substantially as described.

8. In a measuring instrument, the combination of a single magnet having adjacent extremities, a plurality of air-gaps between said extremities, a plurality of indicators operated by mechanisms, each of said mechanisms being under the influence of one of said air-gaps, connections between said mechanisms and a source or sources of current to be measured, and calibrated scales adapted to indicate the movement of said indicators, substantially as described.

9. In a measuring instrument, the combination of a single magnet having adjacent extremities, a plurality of air-gaps between said extremities, a plurality of mechanisms each of which is under the influence of one of said air-gaps, connections between said mechanisms and a source or sources of current to be measured, a plurality of calibrated scales, and a plurality of indicating-needles moved by said mechanisms, said needles being movable in parallel planes, substantially as described.

10. In a measuring instrument, the combination of a single magnet having adjacent extremities, a plurality of air-gaps between said extremities, a plurality of mechanisms each of which is under the influence of one of said air-gaps, connections between said mechanisms and a source or sources of current to be measured, a plurality of calibrated scales, and a plurality of indicating-needles moved by said mechanisms, said needles being movable in parallel superposed planes, substantially as described.

In testimony whereof I affix my signature in presence of two witnesses.

ADRIAN H. HOYT.

Witnesses:
  DAVID F. DUDLEY,
  BLANCHE L. DUDLEY.